Figure 1:
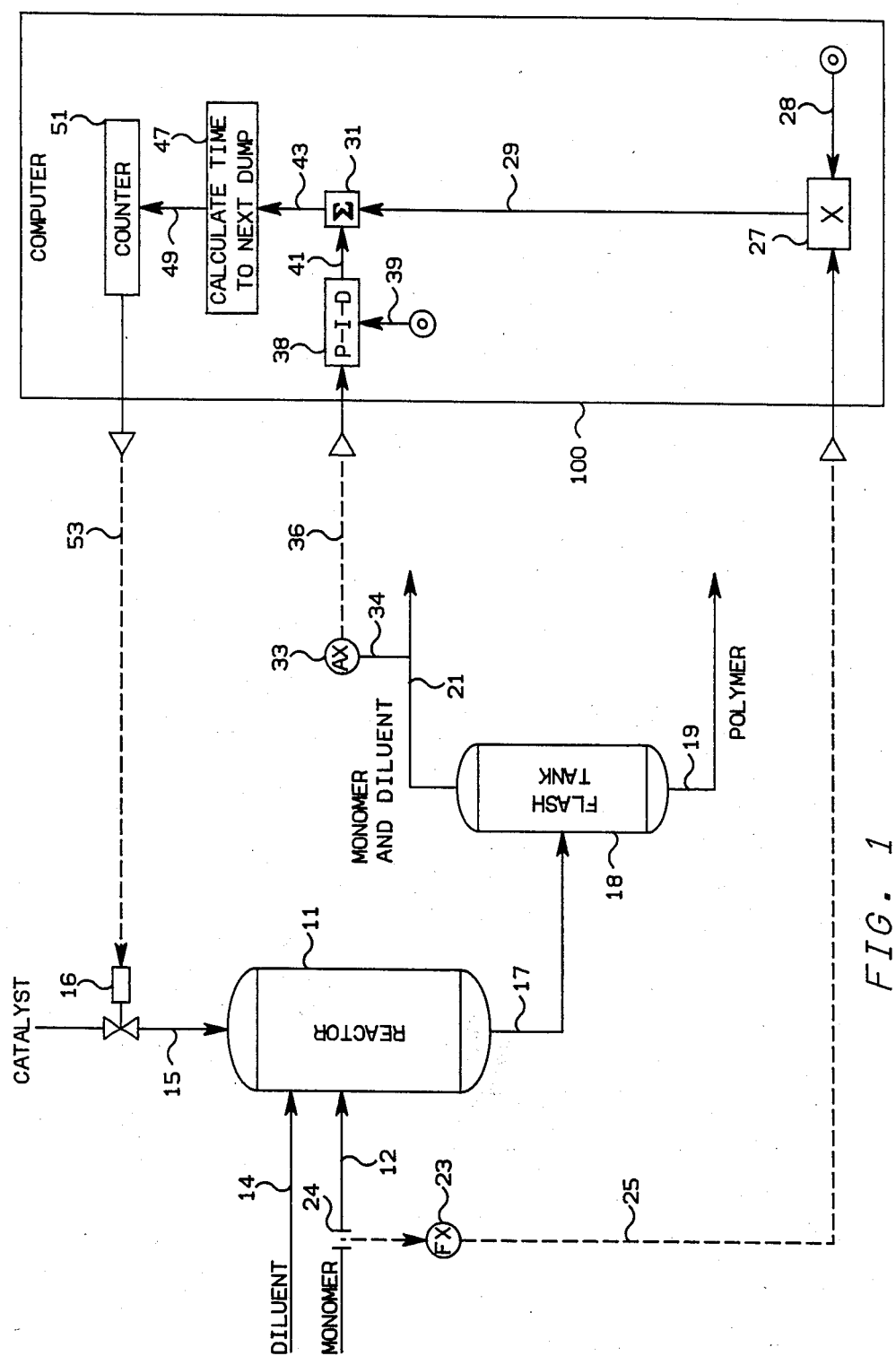

United States Patent [19]

Hofferber

[11] Patent Number: 4,628,034
[45] Date of Patent: Dec. 9, 1986

[54] CONTROL OF A POLYMERIZATION REACTION

[75] Inventor: James A. Hofferber, Bartlesville, Okla.

[73] Assignee: Phillips Petroleum Company, Bartlesville, Okla.

[21] Appl. No.: 728,913

[22] Filed: Apr. 30, 1985

Related U.S. Application Data

[62] Division of Ser. No. 394,089, Jul. 1, 1982, Pat. No. 4,533,517.

[51] Int. Cl.[4] .......................... C08F 2/00; G01N 31/00
[52] U.S. Cl. ...................................... 436/55; 436/142; 526/59; 526/62; 526/86
[58] Field of Search .......................... 422/62, 111, 116; 436/55, 142; 526/59, 62, 86; 364/499, 500

[56] References Cited

U.S. PATENT DOCUMENTS

| | | | |
|---|---|---|---|
| 3,080,219 | 3/1963 | Harvey, Jr. | 23/253 |
| 3,108,094 | 10/1963 | Morgan | 526/59 |
| 3,130,187 | 4/1964 | Tolin et al. | 260/94.9 |
| 3,156,537 | 11/1964 | McLeod | 422/116 |
| 3,290,116 | 12/1966 | Carroll | 23/230 |
| 3,492,283 | 1/1970 | Miller | 260/94.9 |
| 3,659,171 | 4/1972 | Morgan | 318/443 |
| 3,850,582 | 11/1974 | Luckenbach | 23/288 S |
| 3,951,604 | 4/1976 | Smith et al. | 23/253 |
| 3,998,995 | 12/1976 | Buss et al. | 526/59 |

Primary Examiner—Michael S. Marcus
Attorney, Agent, or Firm—French and Doescher

[57] ABSTRACT

A desired unreacted monomer concentration is maintained in the reaction effluent removed from a polymerization reactor by manipulating the catalyst feed rate to the polymerization reactor.

4 Claims, 1 Drawing Figure

CONTROL OF A POLYMERIZATION REACTION

This application is division of application Ser. No. 394,089, filed July 1, 1982 now U.S. Pat. No. 4,533,517.

This invention relates to control of a polymerization reaction. In one aspect this invention relates to method and apparatus for maintaining a desired unreacted monomer concentration for a polymerization reaction.

In a typical polymerization reaction, monomer, diluent and catalyst are fed to a reactor where the monomer is polymerized. The diluent does not react but is typically utilized to control solids concentration and also to provide a convenient mechanism for introducing the catalyst into the reactor. The mixture of polymer, diluent and unreacted monomer are removed from the reactor and fed to a flash tank where the polymer is separated from the diluent and unreacted monomer. Typically, the catalyst will be contained in the polymer.

Catalyst is fed into the reactor through a special valve which is generally referred to as a ball check feeder or shot feeder. The valve fills with a mixture of catalyst and diluent. Periodically, the catalyst feeder valve is actuated and this mixture is dumped into the reactor. The catalyst feeder valve is then recycled to a closed position and is refilled in preparation for the next actuation.

It is important to control the concentration of the unreacted monomer because some of the properties of the polymer produced, such as melt index, are highly dependent on the unreacted monomer concentration. In the past, the unreacted monomer concentration has generally been controlled by manipulating either the monomer feed rate or the diluent feed rate. However, this type of control would mean that either the solids concentration or the production rate of polymer would not be controlled with is undesirable.

It is thus an object of this invention to provide method and apparatus for maintaining a desired unreacted monomer concentration for a polymerization reaction without requiring manipulation of either monomer feed rate of diluent feed rate.

In accordance with the present invention, method and apparatus is provided whereby the time which should elapse until the next actuation of the catalyst feeder valve, in order to maintain a desired unreacted monomer concentration, is calculated. Actuation of the catalyst feeder valve is controlled based on this calculation to provide a catalyst feed rate which will maintain a desired unreacted monomer concentration. In this manner, the production rate and solids concentration may be controlled by conventional methods of controlling monomer flow rate and diluent flow rate and also the unreacted monomer concentration can be controlled by manipulating the catalyst feed rate.

Other objects and advantages of the invention will be apparent from the foregoing brief description from the invention and from the drawing which is briefly described as follows:

FIG. 1 is a diagrammatic illustration of a polymerization reaction system and the associated control system of the present invention.

The invention is described in terms of the polymerization of ethylene. However, the invention is applicable to any polymerization reaction where a catalyst is introduced periodically and it is desired to control the unreacted monomer concentration.

A specific control system configuration is set forth in FIG. 1 for the sake of illustration. However, the invention extends to different types of control system configurations which accomplish the purpose of the invention. Lines designated as signal lines in the drawings are electrical or pneumatic in this preferred embodiment. Generally, the signals provided from any transducer are electrical in form. However, the signals provided from flow sensors will generally be pneumatic in form. Transducing of these signals is not illustrated for the sake of simplicity because it is well known in the art that if a flow is measured in pneumatic form it must be transduced to electrical form if it is to be transmitted in electrical form by a flow transducer. Also, transducing of the signals from analog form to digital form or from digital form to analog form is not illustrated because such transducing is also well known in the art.

The invention is also applicable to mechanical, hydraulic or other signal means for transmitting information. In almost all control systems some combination of electrical, pneumatic, mechanical or hydraulic signals will be used. However, use of any other type of signal transmission, compatible with the process and equipment in use, is within the scope of the invention.

A digital computer is used in the preferred embodiment of this invention to calculate the required control signal based on measured process parameters as well as set points supplied to the computer. Other types of computing devices could also be used in the invention. The digital computer is preferably an OPTROL 7000 Process Computer System from Applied Automation, Inc., Bartlesville, Okla.

Signal lines are also utilized to represent the results of calculations carried out in a digital computer and the term "signal" is utilized to refer to such results. Thus, the term signal is used not only to refer to electrical currents or pneumatic pressures but is also used to refer to binary representations of a calculated or measured value.

The digital controller shown may utilize the various modes of control such as proportional, proportional-integral, proportional-derivative, or proportional-integral-derivative. In this preferred embodiment, a proportional-integral-derivative controller is utilized but any controller capable of accepting two input signals and producing a scaled output signal, representative of a comparison of the two input signals, is within the scope of the invention.

The scaling of an output signal by a controller is well known in control system art. Essentially, the output of a controller may be scaled to represent any desired factor or variable. An example of this is where a desired flow rate and an actual flow rate is compared by a controller. The output could be a signal representative of a desired change in the flow rate of some gas necessary to make the desired and actual flows equal. On the other hand, the same outout signal could be scaled to represent a percentage or could be scaled to represent a temperature change required to make the desired and actual flows equal. If the controller output can range from 0 to 10 volts, which is typical, then the output signal could be scaled so that an output signal having a voltage level of 5.0 volts corresponds to 50 percent, some specified flow rate, or some specified temperature.

The various transducing means used to measure parameters which characterize the process and the various signals generated thereby may take a variety of forms or formats. For example, the control elements of the system can be implemented using electrical analog, digital electronic, pneumatic, hydraulic, mechanical or other similar types of equipment or combinations of one or more such equipment types. Likewise, the format of the various signals can be modified substantially in order to accommodate signal format requirements of the particular installation, safety factors, the physical characteristics of the measuring or control instruments and other similar factors. For example, a raw flow measurement signal produced by a differential pressure orifice flow meter would ordinarily exhibit a generally proportional relationship to the square of the actual flow rate. Other measuring instruments might produce a signal which is proportional to the measured parameter, and still other transducing means may produce a signal which bears a more complicated, but known, relationship to the measured parameter. Regardless of the signal format or the exact relationship of the signal to the parameter which it represents, each signal representative of a measured process parameter or representative of a desired process value will bear a relationship to the measured parameter or desired value which permits designation of a specific measured or desired value by a specific signal value. A signal which is representative of a process measurement or desired process value is therefore one from which the information regarding the measured or desired value can be readily retrieved regardless of the exact mathematical relationship between the signal units and the measured or desired process units.

Referring now to FIG. 1, there is illustrated a polymerization reactor 11. Ethylene is provided to the polymerization reactor 11 through conduit means 12. In like manner, a diluent such as isobutane is provided to the polymerization reactor 11 through conduit means 14 and a catalyst, such as a typical chromium oxide on silica catalyst or silica-titania catalyst, is provided to the polymerization reactor 11 through conduit means 15. As has been previously stated, the catalyst flowing through conduit means 15 will be introduced periodically into the reactor 11. This is accomplished by use of the catalyst feeder valve 16 which is operably located in conduit means 15.

The reaction effluent is removed from the reactor 11 through conduit means 17 and is provided to the flash tank 18. The reaction effluent will be made up of polyethylene, unreacted ethylene, and isobutane. The catalyst will generally be contained in the polyethylene.

The polyethylene is separated from the unreacted ethylene and the isobutane in the flash tank 18. Polyethylene is removed from the flash tank 18 through conduit means 19. Unreacted ethylene and isobutane are removed from the flash tank 18 through conduit means 21.

The polymerization reaction system described to this point is conventional. It is the manner in which the polymerization reaction system is controlled so as to maintain a desired unreacted ethylene concentration that provides the novel features of the present invention.

Flow transducer 23 in combination with the flow sensor 24, which is operably located in conduit meas 12, provides an output signal 25 which is representative of the flow rate of ethylene through conduit means 12. Signal 25 is provided from the flow transducer 23 as an input to computer 100 and specifically to the multiplying block 27.

The multiplying block 27 is also provided with a constant input signal 28 which is representative of a prediction of the catalyst to feed weight ratio required to maintain a desired unreacted ethylene concentration. Signal 28 would generally be established based on operating experience. It is not necessary that signal 28 be exact but it is desirable to come as close as possible to the exact catalyst to feed weight ratio which will result in a desired unreacted ethylene concentration. It is also noted that it may be necessary to change the magnitude of signal 28 periodically if process conditions change.

Signal 25 is multiplied by signal 28 to establish signal 29 which is representative of the feed rate of catalyst required to maintain the desired catalyst to feed weight ratio represented by signal 28. Signal 29 would typically have the units of pounds per hour. Signal 29 is provided from the multiplying block 27 as a first input to the summing block 31.

A sample of the fluid flowing through conduit means 21 is provided to the analyzer transducer 33 through conduit means 34. The analyzer transducer 33 is preferably a chromatographic analyzer such as the OPTICHROM 102 chromatographic analyzer from Applied Automation, Inc., Bartlesville, Okla. The analyzer transducer 33 provides an output signal 36 which is representative of the concentration of ethylene in the fluid flowing through conduit means 21. Essentially, signal 36 is representative of the concentration of unreacted ethylene removed from the reactor 11. Signal 36 is provided from the analyzer transducer 33 as an input to computer 100 and is specifically provided to the controller block 38.

The controller block 38 is also provided with a set point signal 39 which is representative of the desired unreacted ethylene concentration. In response to signals 36 and 39, the controller block 38 provides an output signal 41 which is responsive to the difference between signals 36 and 39. Essentially, signal 41 may be considered a biasing term which is representative of any change in the desired catalyst feed rate, represented by signal 29, required to maintain a desired unreacted ethylene concentration. Also, signal 41 could be considered a correction to the prediction represented by signal 28. Signal 41 is provided from the controller block 48 as a second input to the summing block 31.

Signals 29 and 41 are summed to establish signal 43. Signal 43 is representative of the desired catalyst feed rate. Again, the units of signal 43 are typically pounds per hour. Signal 43 is provided from the summing block 31 as an input to block 47.

In response to signal 43, the time until the feeder valve 16 should be actuated to dump catalyst into reactor 11 is calculated using formula 1.

$$T = (V_c \times D_c)/F_c \quad (1)$$

where

T = the time interval which should elapse between the time the counter 51 is set (described hereinafter) and the dumping of catalyst by actuation of the catalyst feeder valve 16;

$V_c$ = the volume of catalyst fed into the reactor 11 each time the catalyst feeder valve 16 is actuated;

$D_c$ = the density of the catalyst; and $F_c$ = the desired catalyst feed rate which is determined by the magnitude of signal 43.

Signal 49, which is representative of the calculated time (T) is provided to the counter 51. The counter 51 is set in response to signal 49 and counts down to zero or some other predetermined count at which time signal 53, which is provided as an output from the counter and from computer 100, actuates the catalyst feeder valve 16. After actuation of the catalyst feeder valve 16, the counter 51 is reset based on the latest calculated time (T). After being reset, the counter 51 will again actuate the catalyst feeder valve 16 upon reaching a count of zero or some other predetermined count.

Signal 43 is calculated periodically and may be calculated a number of times between the time the counter 51 is set and the time the catalyst feeder valve 16 is actuated. Preferably, the latest value for signal 43 is used to reset counter 51 immediately after actuation of the catalyst feeder valve 16. Thus, the time represented by signal 43 is actually the time between actuations of the catalyst feed valve 16.

It is noted that setting of the counter 51 could be delayed by some fixed time and the time represented by signal 43 would not be strictly representative of the time between actuations of the catalyst feeder valve 16 but would rather be representative of the time between setting of the counter 51 and the actuation of the catalyst feed valve 16. However, such a delayed setting of the counter 51 is not preferred since it would be necessary to compensate for such delayed setting in formula (1).

Essentially, signal 29 may be considered as a feed forward or predictive portion of the control system which compensates for changes in the ethylene feed rate. Changes in the ethylene feed rate result in changes in the polyethylene production rate and also result in changes in the unreacted ethylene concentration if not compensated for by a change in the catalyst feed rate. Signal 41 may be considered the feed back or biasing portion of the control system since signal 41 is based on an actual analysis of the unreacted ethylene concentration. The feed forward term prevents long periods of off specifiction production since the catalyst feed rate will be changed in response to a change in the ethylene feed rate while the feed back term trims the feed forward term to remove any inaccuracies which may arise because signal 28 is predictive in nature and the magnitude of signal 28 will not generally be the exact value which will maintain a desired unreacted ethylene concentration.

The invention has been described in terms of a preferred embodiment as illustrated in FIG. 1. Flow transducers and flow sensors which may be utilized to measure the flow rate of the ethylene flowing through conduit means 12 are illustrated and described at length in Perry's Chemical Engineers Handbook, 4th edition, chapter 22, McGraw-Hill. A catalyst feeder valve which may be utilized is a Seiscor Ball Check Feeder Valve.

For reasons of brevity and clarity, conventional auxilliary equipment such as pumps and other process equipment have not been included in the above description as they play no part in the explanation of the invention. Also, additional measurement-control devices such as the devices which would be utilized to control the flow rate of the diluent and the ethylene have not been illustrated since control of the flow rate of the diluent and the monomer do not play any part in the explanation of the invention.

While the invention has been described in terms of the presently preferred embodiment, reasonable variations and modifications are possible by those skilled in the art and such variations are within the scope of the described invention and the appended claims.

That which is claimed is:

1. A method for maintaining a desired unreacted monomer concentration in the reaction effluent withdrawn from a polymerization reactor, wherein monomer is provided as a feed to said polymerization reactor, wherein catalyst is provided periodically through a catalyst feeder valve to said polymerization reactor and wherein said reaction effluent contains polymer and unreacted monomer, said method comprising the steps of:

establishing a first signal representative of the time which should elapse until the next actuation of said catalyst feeder valve in order to maintain a desired concentration of unreacted monomer in the reaction effluent withdrawn from said polymerization reactor, wherein actuation of said catalyst feeder valve introduces a predetermined volume of catalyst into said polymerization reactor and wherein said first signal is established in part in response to the actual unreacted monomer concentration; and actuating such catalyst feeder valve when the time represented by said first signal has elapsed to add catalyst to said polymerization reactor so as to maintain a desired concentration of unreacted monomer in the reaction effluent withdrawn from said polymerization reactor.

2. A method in accordance with claim 1 wherein said step of establishing said first signal comprises:

establishing a second signal representative of monomer flow rate to said polymerization reactor;

establishing a third signal representative of a prediction of the monomer to catalyst weight ratio required to maintain the actual unreacted monomer concentration substantially equal to a desired unreacted monomer concentration;

multiplying said second signal and said third signal to establish a fourth signal which is representative of a prediction of the weight of catalyst which should be supplied to said polymerization reactor per unit time in order to maintain the actual unreacted monomer concentration substantially equal to the desired unreacted monomer concentration;

establishing a fifth signal representative of the actual unreacted monomer concentration;

establishing a sixth signal representative of the desired unreacted monomer concentration;

comparing said fifth signal and said sixth signal and establishing a seventh signal which is responsive to the difference between said fifth signal and said sixth signal, wherein said seventh signal is scaled so as to be representative of any change in the magnitude of said fourth signal required to maintain the actual unreacted monomer concentration substantially equal to the desired unreacted monomer concentration; and combining said fourth signal and said seventh signal to establish said first signal.

3. A method in accordance with claim 2 wherein said step of actuating said catalyst feeder valve when the time represented by said first signal has elapsed comprises:

setting a counter to the time represented by said first signal; and supplying a signal from said counter to actuate said catalyst feeder valve when said counter reaches a predetermined count after being set to the time represented by said first signal.

4. A method in accordance with claim 3 wherein the time represented by said first signal is representative of the time which should elapse between actuations of said catalyst feeder valve.

* * * * *